(12) United States Patent
Corazza et al.

(10) Patent No.: US 9,977,130 B2
(45) Date of Patent: May 22, 2018

(54) DISRUPTION DETECTION OF A POSITIONING MEASUREMENT DIFFERENTIAL CORRECTION MESSAGE OF A SATELLITE GEOLOCATION DEVICE

(71) Applicant: THALES, Courbevoie (FR)

(72) Inventors: Stéphane Corazza, Valence (FR);
Stéphane Rollet, Valence (FR);
Laurent Papin, Valence (FR); Audrey Guilloton, Valence (FR); Bruno Montagne, Valence (FR)

(73) Assignee: THALES, Courbevoie (FR)

( * ) Notice: Subject to any disclaimer, the term of this patent is extended or adjusted under 35 U.S.C. 154(b) by 274 days.

(21) Appl. No.: 14/918,795

(22) Filed: Oct. 21, 2015

(65) Prior Publication Data

US 2016/0109578 A1    Apr. 21, 2016

(30) Foreign Application Priority Data

Oct. 21, 2014  (FR) ...................................... 14 02362

(51) Int. Cl.
*G01S 19/21* (2010.01)
*G01S 19/20* (2010.01)
*G01S 19/41* (2010.01)

(52) U.S. Cl.
CPC ............ *G01S 19/215* (2013.01); *G01S 19/20* (2013.01); *G01S 19/41* (2013.01)

(58) Field of Classification Search
CPC ......... G01S 19/215; G01S 19/41; G01S 19/20
See application file for complete search history.

(56) References Cited

U.S. PATENT DOCUMENTS 5,359,521 A * 10/1994 Kyrtsos ................... G01S 19/41
340/988
7,747,384 B1   6/2010 Bhalchandra
(Continued)

FOREIGN PATENT DOCUMENTS

EP     2146217 A1    1/2010

OTHER PUBLICATIONS

French Search Report dated Sep. 23, 2015 issued in corresponding French Application No. 1402362.

*Primary Examiner* — Bernarr E Gregory
*Assistant Examiner* — Fred H Mull
(74) *Attorney, Agent, or Firm* — Troutman Sanders LLP

(57) ABSTRACT

The invention relates to a disruption detection method and device for a positioning measurement correction message of a satellite geolocation device, able to receive a composite radio signal including a plurality of signals each emitted by a satellite in view of the geolocation device, and a positioning measurement differential correction message (MC) emitted by a satellite geolocation precision augmentation system. The device (20) according to the invention includes modules (32) computing, for each of the satellites in view, at least one differential correction coherence metric depending on a positioning measurement differential correction ($C_{AS}$) extracted from the received differential correction message (MC). The device (20) also includes a module (34) detecting a disruption of the correction message when the number of satellites for which the differential correction coherence metric is above a predetermined threshold exceeds a predetermined number of satellites ($N_0$), strictly greater than one.

12 Claims, 4 Drawing Sheets

(56) References Cited

U.S. PATENT DOCUMENTS

| | | |
|---|---|---|
| 8,742,984 B2 | 6/2014 | Trautenberg |
| 2009/0322598 A1* | 12/2009 | Fly .................. G01S 19/41 342/357.48 |
| 2011/0181465 A1 | 7/2011 | Rongsheng |
| 2012/0019411 A1* | 1/2012 | Trautenberg ............ G01S 19/41 342/357.24 |

\* cited by examiner

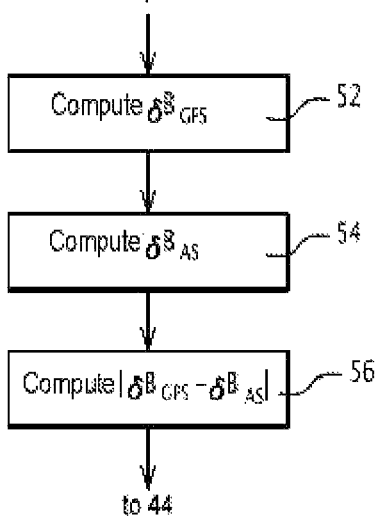
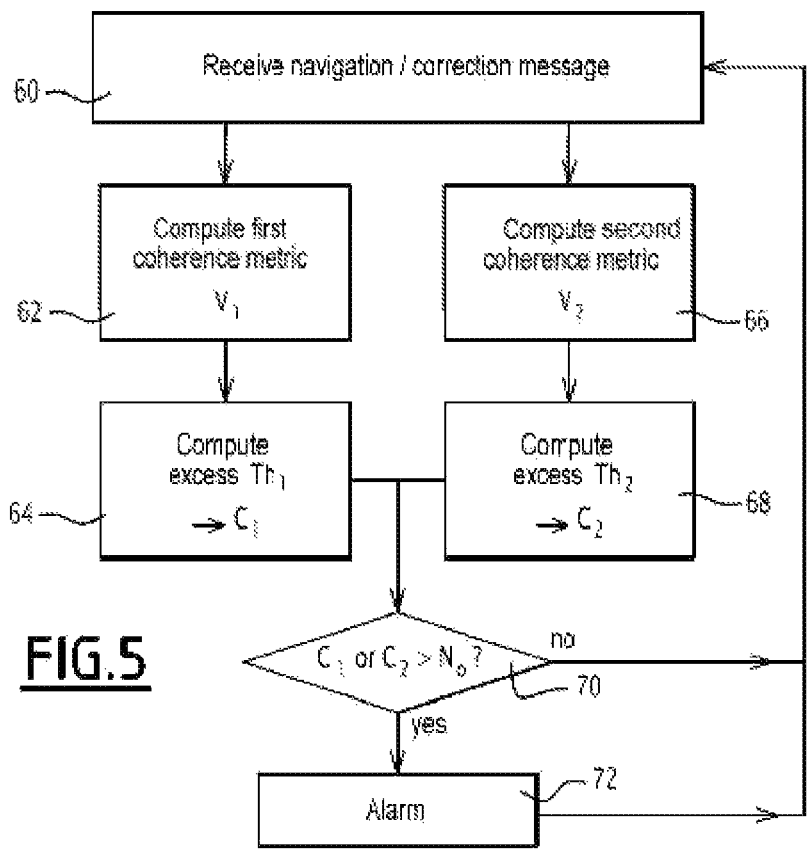
FIG.4
FIG.5

DISRUPTION DETECTION OF A POSITIONING MEASUREMENT DIFFERENTIAL CORRECTION MESSAGE OF A SATELLITE GEOLOCATION DEVICE

CROSS-REFERENCE TO RELATED APPLICATIONS

The present application claims priority to French Patent Application Serial No. 1402362, filed Oct. 21, 2014, the contents of which are hereby incorporated by reference in its entirety.

BACKGROUND OF THE INVENTION

The present invention relates to a method and device for detecting a disruption of a positioning measurement differential correction message of a satellite geolocation device.

The invention falls within the field of securing satellite geolocation, in the context of possible intentional disruptions seeking to deceive a geolocation device.

It is applicable in many fields, for example aeronautics, maritime transport, road guidance, vehicle and robot guidance.

Today, satellite geolocation is widely used for precise positioning or for moving vehicles, provided with geolocation devices.

Owing to GNSS (Global Navigation Satellite System), a geolocation device, including a receiver for signals emitted by an appropriate satellite, is able to receive navigation messages including radio signals emitted by a plurality of satellites and to provide, after computation, positioning information of the carrier of the geolocation device in a geographical reference.

Each geolocation device captures information sent in radio signals transmitted by various satellites, and computes, for each satellite in view and from that received information, a positioning measurement, which is an estimate of the distance between the geolocation device itself and the satellite in view, which is also called pseudo-range. The pseudo-range is different from the actual distance between the satellite in question and the geolocation device due to potential errors in the received information, for example due to atmospheric conditions in the troposphere, and the error in the internal clock geolocation device. It is possible to compute a positioning measurement error correction from information sent by a plurality of separate satellites.

The GPS system (Global Positioning System) is a widely used satellite geolocation system.

Known systems exist for increasing satellite geolocation precision.

For example, the geostationary satellite spatial augmentation system, called SBAS (satellite-based augmentation system), uses geostationary satellites that listen to the constellation of positioning satellites of the GNSS system, such as the GPS system, and is able to send a receiving geolocation device correction messages comprising correction information for positioning measurements and integrity relative to each of the positioning satellites.

The SBAS system accounts for errors from separate sources: ionospheric error, tropospheric error. It includes orbit corrections for GNSS satellites, and specific corrections. The SBAS system also provides integrity information, designed to quantify the confidence associated with the sent correction information.

Technical standard RTCA DO-229D "Minimum Operational Performance Standards for Global Positioning System/Wide Area Augmentation System Airborne Equipment" defines the SBAS spatial augmentation system relative to the GPS system.

One such alternative augmentation system for positioning precision is the GBAS system (ground-based augmentation system), which uses reference segments positioned on the ground, these reference segments including GNSS receivers able to receive information from positioning satellites and compute their position from that received information. The precise position of the reference segments being known, it is possible to compute positioning measurement corrections. The GBAS system also provides integrity information, similarly to the SBAS system.

Geolocation security and integrity verification systems exist aiming to detect the presence of added disruption signals, also called decoy signals, similar to the radio signals emitted by the satellites but bearing erroneous information seeking to cause an erroneous computation of positioning information.

However, it is also necessary to consider the possibility of intentional disruption of differential correction messages for positioning measurements used by the SBAS or GBAS receivers, seeking to cause an erroneous position to be computed for the geolocation device including the receiver.

The invention aims to detect such disruptions of positioning measurement differential correction messages emitted by satellite geolocation precision augmentation systems.

SUMMARY OF THE INVENTION

To that end, the invention proposes a method for detecting a disruption of a positioning measurement correction message of a satellite geolocation device, able to receive a composite radio signal including a plurality of signals each emitted by a satellite in view of the geolocation device, and a positioning measurement differential correction message emitted by a satellite geolocation precision augmentation system.

The method according to the invention comprises the following steps:
computing, for each of the satellites in view, at least one differential correction coherence metric depending on a positioning measurement differential correction extracted from the received differential correction message,
detecting a disruption of the correction message when the number of satellites for which the differential correction coherence metric is above a predetermined threshold exceeds a predetermined number of satellites, strictly greater than one.

Advantageously, the invention makes it possible to detect the presence of a disruption of a positioning measurement differential correction message, and therefore to alert the user of the potential presence of spoofing, and consequently to improve the geolocation security.

The disruption detection method for a positioning measurement differential correction message according to the invention may also have one or more of the features below, considered in all technically acceptable combinations.

If a disruption is detected, an alarm is raised.

The predetermined number of satellites is greater than or equal to three.

Two differential correction coherence metrics are computed.

The computation step includes the following sub-steps:
computing, from the received composite radio signal, a first difference between a measured distance and an estimated distance between the geolocation device and the satellite in view,
computing, using said received positioning measurement differential correction message, a second difference between a measured distance and an estimated distance between the geolocation device and the satellite in view,
computing the absolute value of the deviation between said first difference and said second difference.

The first difference between a measured distance and an estimated distance depends on a first correction term obtained from the received composite signal, and the second difference between a measured distance and an estimated distance depends on a second correction term obtained from the received differential correction message.

The absolute value of the deviation between the first difference and the second difference is compared to a threshold depending on said satellite in view, as a function of the first correction term applicable to said satellite in view.

The computation step further includes computing a differential correction coherence metric equal, for each satellite in view, to the absolute value of the positioning measurement differential correction extracted from the received differential correction message.

The satellite geolocation precision augmentation system is a SBAS system.

According to a second aspect, the invention relates to a disruption detection device for a positioning measurement correction message of a satellite geolocation device, able to receive a composite radio signal including a plurality of signals each emitted by a satellite in view of the geolocation device, and a positioning measurement differential correction message emitted by a satellite geolocation precision augmentation system.

The device includes modules for:
computing, for each of the satellites in view, at least one differential correction coherence metric depending on a positioning measurement differential correction extracted from the received differential correction message,
detecting a disruption of the correction message when the number of satellites for which the differential correction coherence metric is above a predetermined threshold exceeds a predetermined number of satellites, strictly greater than one.

The advantages of the claimed device are similar to those of the disruption detection method briefly described above.

BRIEF DESCRIPTION OF THE DRAWINGS

Other features and advantages of the invention will emerge from the description thereof provided below, for information and non-limitingly, in reference to the appended figures, in which:
FIG. 4 illustrates an embodiment of the computation of a differential correction coherence metric;
FIG. 5 is a flowchart of the main steps of a disruption detection method for the differential correction message according to another embodiment of the invention.

DETAILED DESCRIPTION OF THE PREFERRED EMBODIMENTS

The invention will be described below in the case where the GPS geolocation system is used.

However, the invention is not limited to this scenario, and more generally applies to any other GNSS geolocation system.

Figure 1:
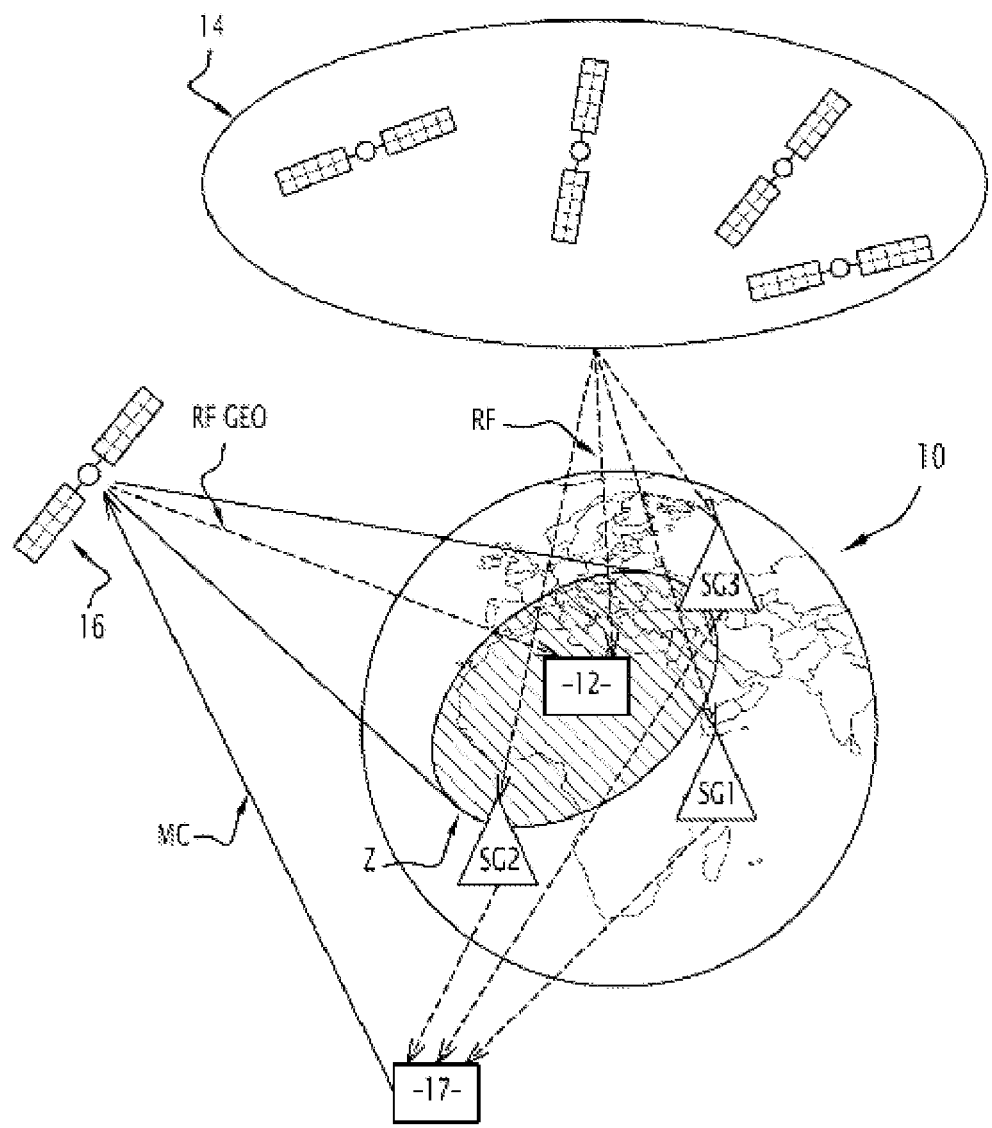
FIG. 1 is a diagrammatic illustration of a geolocation system.

FIG. 1 illustrates a satellite geolocation system 10, including a receiver geolocation device 12, which is a user geolocation device, positioned onboard a moving platform, for example an aircraft (not shown).

The geolocation device 12 is able to receive GPS-type signals from a constellation of satellites 14 using a receiver, including a plurality of satellites, at least four of which are in view of the geolocation device 12.

The radio signals emitted by the satellites in view of the geolocation device 12 are received at a receiving antenna of that geolocation device 12, in the form of a navigation message including a composite radio signal RF.

The geolocation device 12 comprises circuits adapted to separate the received signals by satellite channel with index i (corresponding to the satellite Si) and computing processors adapted to compute a pseudo-range and an estimated range for each of the processed satellite channels. The geolocation is done by triangulation based on the received information.

The geolocation system 10 also includes a geostationary satellite 16, which has an associated coverage zone Z. The geolocation device 12 is able to receive the signals RF GEO and extract the differential correction messages MC therefrom, including integrity information and positioning measurement differential corrections with respect to each of the satellites of the constellation 14. Stations SG1, SG2, SG3 receive the radio signals emitted by the GPS satellites at an antenna. The stations are able to separate the received signals by satellite channel with index i (corresponding to the satellite Si) and compute a pseudo-range. These pseudo-ranges are sent to a computation device 17, such as a computer, that develops the correction messages MC. The latter are loaded on the geostationary satellites 16 to be resent through its downlink RF GEO.

By hypothesis, the radio signals RF received from the GNSS constellation 14 are licit signals, positioning computation errors being able to occur due to atmospheric conditions, and any clock deviations between the clock of the geolocation device and the clocks of the satellites of the constellation 14.

The differential correction messages sent by the satellite geolocation precision augmentation system may be disrupted and cause an erroneous geolocation computation. In that case, there is a spoofing attack at the positioning measurement differential correction.

Figure 2:
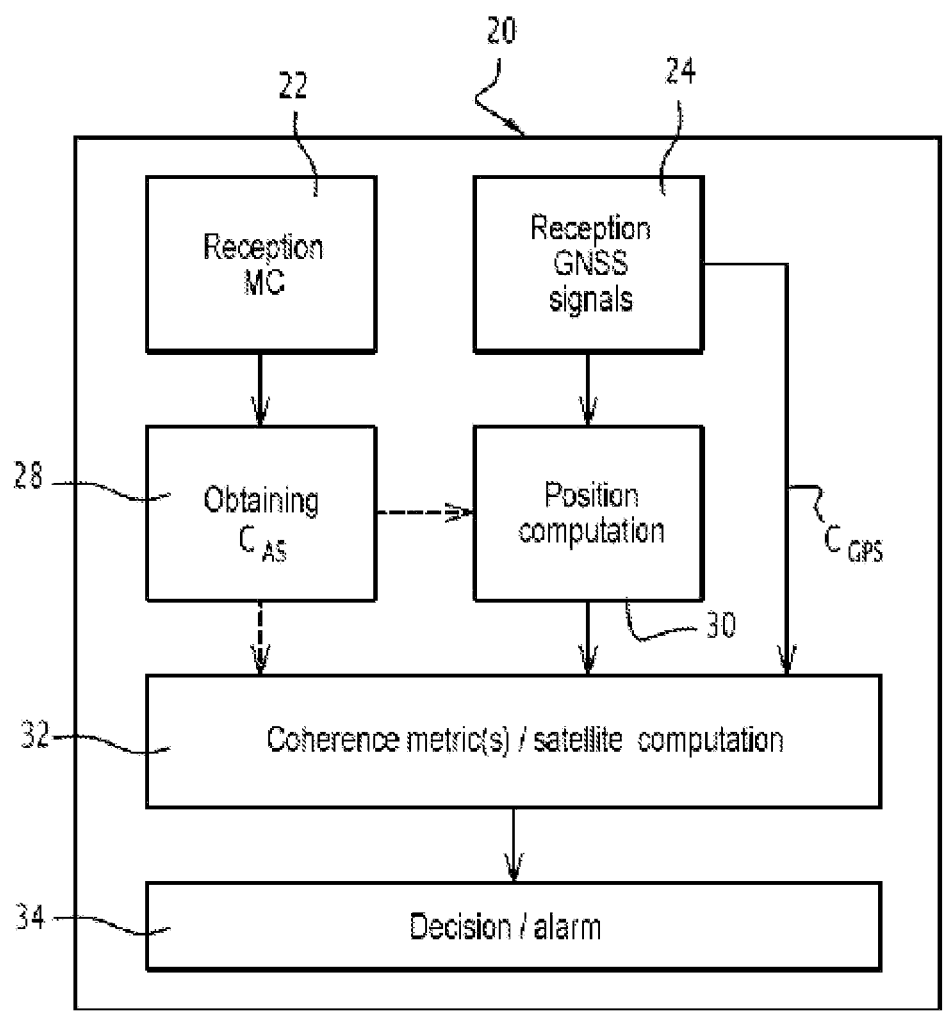
FIG. 2 diagrammatically illustrates the functional modules of a geolocation device able to implement the invention.

FIG. 2 diagrammatically illustrates a geolocation device 20 able to detect a disruption of the positioning measurement differential correction message.

The device 20 includes a module 22 for receiving differential correction messages MC according to a positioning precision augmentation system.

In one embodiment, these are SBAS differential correction messages.

Alternatively, a GBAS precision augmentation system is used, and the differential correction messages are GBAS messages.

The device 20 also includes a module 24 for receiving radio signals from the GNSS satellite constellation, for example GPS signals. The reception module 24 develops the positioning measurements and the GPS corrections: $C_{GPS}$.

The module 28 makes it possible to obtain, for each satellite Si in view, a position correction $C_{AS,i}$ from the received differential correction message MC.

A geolocation computation module 30 makes it possible to compute an estimated position of the device 20, based on the received positioning measurements, the GPS geolocation correction and/or the position correction $C_{AS,i}$ obtained from differential correction messages MC.

The geolocation device 20 further includes a module 32 for computing at least one differential correction coherence metric for each satellite Si in view, and a module 34 for deciding and raising an alarm.

The modules 32, 34 are implemented by a computing device including at least a processor and a memory. Such a computing device is for example a computer.

As a variant, the computing device is embodied by an integrated circuit such as an FPGA ("field-programmable gate array) or an ASIC ("application specific integrated circuit").

The module 34 uses the computed differential correction coherence metric(s) and detects any disruption of the received differential correction messages.

Figure 3:
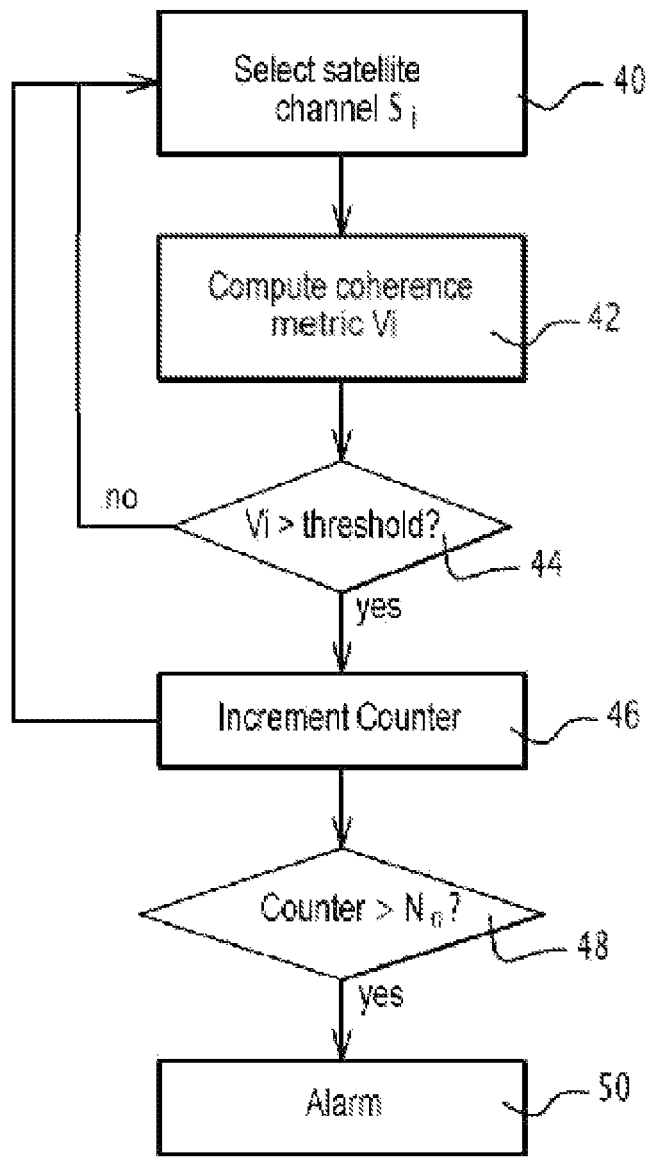
FIG. 3 is a flowchart of the main steps of a disruption detection method for the differential correction message according to a first embodiment of the invention.

FIG. 3 illustrates the main steps of a disruption detection method for a positioning measurement differential correction message according to one embodiment of the invention.

The method is implemented periodically, at a given moment in time, for example every second.

During a first step 40, a satellite channel Si corresponding to a satellite in view of the geolocation device is considered.

Next, at least one differential correction coherence metric Vi, hereinafter simply referred to as a coherence metric, is computed during the computing step 42, taking the position correction $C_{AS,i}$ obtained from the received correction message into account.

As explained below, two such coherence metrics are proposed.

The coherence metric Vi computed for the satellite Si is compared to a predetermined threshold during a comparison step 44.

When Vi is above the threshold, a variable Counter, set at 0, is incremented during step 46.

Step 44 is followed by step 40 previously described, in order to process all of the satellites in view of the geolocation device.

After all of the satellites in view of the geolocation device are processed, the final value of the Counter variable is compared to a predetermined number of satellite channels $N_0$.

Preferably, $N_0$ is greater than or equal to three, in order to minimize the likelihood of a false alarm.

If the Counter variable exceeds the predetermined number $N_0$, an alarm is raised during step 50.

The method as described above is next repeated for a new positioning measurement differential correction message, after resetting the Counter variable to 0.

According to a first embodiment, a first coherence metric depending on the differential correction computed in the computation step 42 is the absolute value of the position correction $C_{AS,i}$:

$$V_{1,i}=|C_{AS,i}|$$

The computed values $V_{1,i}$ are compared to a first threshold $Th_1$.

Preferably, a threshold $Th_1$ comprised between 60 m and 150 m is used, in the civil aviation field corresponding to error allowances compatible with "En Route" aerial operations. Other thresholds can be adjusted based on the targeted application.

According to a second embodiment, a second coherence metric depending on the differential position correction is computed based on differences between measured and estimated distances between each satellite Si and the geolocation device.

Indeed, to compute its geolocation position, the geolocation device resolves a matrix equation making it possible to compute a navigation solution:

$$A \cdot \delta X = \delta B \quad (EQ1)$$

where X is the spatio-temporal positioning of the geolocation device. X comprises the three spatial positioning components x, y and z in an ECEF frame of reference, as well as a time component $b_u$ connecting the GPS time and the local time of the geolocation device.

$\delta X$ is the unknown in (EQ1) and contains deviations relative to the components of X previously computed, A is a matrix comprising as many rows as there are satellites in view of the geolocation device, or I rows, and four columns, and for each column J, comprising the partial deviations of the functions $f_i(X)$ relative to the $J^{th}$ component among the four components of X.

Given the position $(X_I, Y_I, Z_I)$ of the $I^{th}$ satellite, the expression of the function $f_I(X)$ is written:

$$f_I(X)=\sqrt{(x-X_I)^2+(y-Y_I)^2+(z-Z_I)^2}+b_u \quad (EQ2)$$

The module 24 of the device 20 makes it possible to obtain the triplet $(X_I, Y_I, Z_I)$.

The term $\delta B$ comprises, for each satellite Si, the difference between the measured distance between the geolocation device and the satellite Si and the estimated distance between the geolocation device and the satellite Si.

$$\delta B = R - \rho + c \quad (EQ3)$$

Where R is the previously estimated distance, $\rho$ is the position measurement, also called pseudo-range, and c is the differential correction term provided by a navigation or position measurement differential correction message.

The correction terms c come either from GPS models ($C_{GPS}$) sent by satellites of the constellation, therefore navigation messages, or precision augmentation models ($C_{AS}$), coming from geostationary satellites in the case of the SBAS precision augmentation systems or ground reference segments in the case of GBAS precision augmentation systems.

The second coherence matrix is computed, for each satellite in view Si, using the formula:

$$V_{2,i}=|\delta B_{AS}-\delta B_{GPS}| \quad (EQ4)$$

Where $\delta B_{AS}$ is computed taking into account only the correction term $C_{AS}$ coming from the precision augmentation models, and $\delta B_{GPS}$ is computed only taking into account the correction term $C_{GPS}$ sent by each of the satellites Si of the constellation:

$$\delta B_{AS}=R-\rho+C_{AS} \quad (EQ5)$$

$$\delta B_{GPS}=R-\rho+C_{GPS} \quad (EQ6)$$

When the SBAS precision augmentation system is used, the term $C_{AS}$ accounts for the standard tropospheric error model, the GPS orbit correction, the SBAS ionospheric correction, rapid corrections and SBAS slow corrections.

In the case of an intentional disruption of the measurement differential correction message, the term $\delta B_{AS}$ can also comprise an error $Err_{AS}$, designed to cause an erroneous computation of the geolocation position:

$$\delta B_{AS}=R-\rho+C_{AS}=R-\rho+C'_{AS}+Err_{AS} \quad (EQ7)$$

Where $C'_{AS}$ is the real correction term and $Err_{AS}$ the intentional error.

The term $C_{GPS}$ accounts for the standard tropospheric error model, the GPS orbit correction, the SBAS ionospheric correction.

Thus, the second coherence metric is also written:

$$V_{2,i}=|C'_{AS}+Err_{AS}-C_{GPS}| \quad (EQ8)$$

The computed values $V_{2,i}$ are compared to a second threshold $Th_2$, which takes into account the expected precision of the GPS models and the SBAS models. $Th_2$ can be stored beforehand.

Preferably, the second threshold $Th_2$ is comprised in the range [60 m ... 150 m] according to the previous example. Alternatively, the threshold $Th_2$ may be indexed according to $|C_{GPS}|$ applicable to the $i^{th}$ satellite Si, as in the table below.

| $|C_{GPS, i}|$ | $V_{2, i}$ |
|---|---|
| Unavailable | unavailable |
| <10 m | 60 m |
| >=10 m | 150 m |

In this second embodiment, the step for computing a coherence metric 42 comprises the subsequent steps illustrated in FIG. 4 for computing the second coherence metric.

During a first computation step 52, $\delta B_{GPS}$ is computed for the current satellite Si.

Next, during the second computation step 54, $\delta B_{AS}$ is computed for the current satellite Si.

Lastly, during a third computation step 56, the absolute value of the deviation $|\delta B_{AS}-\delta B_{GPS}|$ is computed.

It should be noted that in the alternative, steps 52, 54 are performed before step 40 for selecting a satellite channel Si, for all of the satellites in view.

According to a third embodiment, the two coherence metrics are monitored, and an alarm is raised if the threshold excess counter is above a predetermined number of satellite channels for either of the two metrics.

This embodiment is illustrated in reference to FIG. 5.

The respective navigation and positioning measurement differential correction messages are received during the reception step 60, for a current positioning moment.

It should be noted that the positioning measurement differential correction messages can be received slightly after the navigation messages, the time shift not exceeding 6 seconds.

Next, the first coherence metric is computed, for each satellite in view, during step 62, according to the method previously described, and the counter C1 counting the number of satellites for which the value of the first coherence metric exceeds the threshold Th1 is updated (step 64).

Successively or substantially in parallel, the second coherence metric is computed, for each satellite in view, during step 66, according to the method previously described, and the counter C2 counting the number of satellites for which the value of the second coherence metric exceeds the threshold Th2 is updated (step 68).

Next, these two counters C1, C2 are compared to a predetermined number of satellite channels $N_0$ during a comparison step 70.

If either of these counters exceeds the predetermined number $N_0$, an alarm is raised in step 72.

The comparison step 70, in case of negative comparison, and step 72 are followed by the reception step 60 previously described.

Advantageously, the comparison of the threshold excesses for several satellite channels ($N_0$) makes it possible to avoid a false alarm.

The cumulative test of two coherence metrics makes it possible to improve the detection of a likely decoy introduced into the positioning measurement differential correction message.

The invention claimed is:

1. A method for detecting a disruption of a positioning measurement correction message of a satellite geolocation device, able to receive a composite radio signal including a plurality of signals each emitted by a satellite in view of the geolocation device, and a positioning measurement differential correction message emitted by a satellite geolocation precision augmentation system, comprising:
    computing, for each of the satellites in view, at least one differential correction coherence metric associated with said satellite in view and depending on a positioning measurement differential correction extracted from the received differential correction message, the computation of at least one differential correction comprising:
        computing, from the received composite radio signal, a first difference between a measured distance and an estimated distance between the geolocation device and the satellite in view;
        computing, using said received positioning measurement differential correction message, a second difference between a measured distance and an estimated distance between the geolocation device and the satellite in view; and
        computing an absolute value of a deviation between said first difference and said second difference;
    detecting a disruption of the correction message when the number of satellites in view for which the associated differential correction coherence metric is above a predetermined threshold exceeds a predetermined number of satellites, strictly greater than one; and
    if a disruption is detected, raising an alarm.

2. The disruption detection method according to claim 1, wherein the predetermined number of satellites is greater than or equal to three.

3. The disruption detection method according to claim 1, wherein two differential correction coherence metrics are computed.

4. The disruption detection method according to claim 1, wherein the first difference between a measured distance and an estimated distance depends on a first correction term obtained from the received composite signal, and
    wherein the second difference between a measured distance and an estimated distance depends on a second correction term obtained from the received differential correction message.

5. The disruption detection method according claim 1, wherein the absolute value of the deviation between the first difference and the second difference is compared to a threshold depending on said satellite in view, as a function of the first correction term applicable to said satellite in view.

6. The disruption detection method according to claim 1, wherein the computation of at least one differential correction coherence metric further includes computing a differential correction coherence metric equal, for each satellite in view, to the absolute value of the positioning measurement differential correction extracted from the received differential correction message.

7. The disruption detection method according to claim 1, wherein the satellite geolocation precision augmentation system is a satellite-based augmentation system (SBAS) system.

8. A device detecting a disruption of a positioning measurement correction message of a satellite geolocation device, able to receive a composite radio signal including a plurality of signals each emitted by a satellite in view of the geolocation device, and a positioning measurement differential correction message emitted by a satellite geolocation precision augmentation system, comprising a processor configured to:
  compute, for each of the satellites in view, at least one differential correction coherence metric associated with said satellite in view and depending on a positioning measurement differential correction extracted from the received differential correction message, the computation of at least one differential correction comprising:
    computing, from the received composite radio signal, a first difference between a measured distance and an estimated distance between the geolocation device and the satellite in view;
    computing, using said received positioning measurement differential correction message, a second difference between a measured distance and an estimated distance between the geolocation device and the satellite in view; and
    computing an absolute value of a deviation between said first difference and said second difference;
  detect a disruption of the correction message when the number of satellites in view for which the associated differential correction coherence metric is above a predetermined threshold exceeds a predetermined number of satellites, strictly greater than one; and
  raise an alarm if a disruption is detected.

9. A method for detecting a disruption of a positioning measurement correction message of a satellite geolocation device, able to receive a composite radio signal including a plurality of signals each emitted by a satellite in view of the geolocation device, and a positioning measurement differential correction message emitted by a satellite geolocation precision augmentation system, comprising:
  computing, for each of the satellites in view, at least one differential correction coherence metric associated with said satellite in view and depending on a positioning measurement differential correction extracted from the received differential correction message, the computation of at least one differential correction comprising:
    computing a differential correction coherence metric equal, for each satellite in view, to an absolute value of the positioning measurement differential correction extracted from the received differential correction message;
  detecting a disruption of the correction message when the number of satellites in view for which the associated differential correction coherence metric is above a predetermined threshold exceeds a predetermined number of satellites, strictly greater than one; and
  if a disruption is detected, raising an alarm.

10. The disruption detection method according to claim 9, wherein the predetermined number of satellites is greater than or equal to three.

11. The disruption detection method according to claim 9, wherein the satellite geolocation precision augmentation system is a satellite-based augmentation system (SBAS) system.

12. A device detecting a disruption of a positioning measurement correction message of a satellite geolocation device, able to receive a composite radio signal including a plurality of signals each emitted by a satellite in view of the geolocation device, and a positioning measurement differential correction message emitted by a satellite geolocation precision augmentation system, comprising a processor configured to:
  compute, for each of the satellites in view, at least one differential correction coherence metric associated with said satellite in view and depending on a positioning measurement differential correction extracted from the received differential correction message, the computation of at least one differential correction comprising:
    computing a differential correction coherence metric equal, for each satellite in view, to an absolute value of the positioning measurement differential correction extracted from the received differential correction message;
  detect a disruption of the correction message when the number of satellites in view for which the associated differential correction coherence metric is above a predetermined threshold exceeds a predetermined number of satellites, strictly greater than one; and
  raise an alarm if a disruption is detected.

* * * * *